Oct. 1, 1968   W. G. ATKINSON, JR., ET AL   3,404,259
COMPARATOR APPARATUS AND METHOD OF OPERATION THEREOF
Filed Sept. 17, 1963                         7 Sheets-Sheet 1

FIG. 1

INVENTORS
W. G. ATKINSON JR.
R. P. DE SOTO
B. B. LANDIS
C. PAREDES
BY James J. Romero, Jr.
ATTORNEY

United States Patent Office 3,404,259
Patented Oct. 1, 1968

3,404,259
COMPARATOR APPARATUS AND METHOD
OF OPERATION THEREOF
William G. Atkinson, Jr., 19 Westerly Road, Saddle River, N.J. 07458; Robert P. De Soto, 87 Iroquois Ave., Oakland, N.J. 07436; Bruce B. Landis, 423 Monmouth Ave., New Milford, N.J. 07646; and Candelario Paredes, 89 Danna Way, Saddle Brook, N.J. 07662
Filed Sept. 17, 1963, Ser. No. 309,541
18 Claims. (Cl. 235—61.7)

This invention relates to method and apparatus for rapidly and automatically comparing information of like nature to determine any coincidence therebetween and, more particularly but not necessarily exclusively, to method and apparatus for comparing as above an indicia of identification, as for example an identification number, against a plurality of such numbers to determine whether the former is included in the latter.

The currently prevalent, widespread usage of credit cards for the credit purchases of goods and services has given rise to a not inconsequential problem on the part of the organizations issuing such cards in the making of the retailers of the said goods and services aware of which cards, as represented by the identification numbers thereof, are no longer to be honored for credit purchases for reasons such as loss of the card by the rightful owner thereof, or failure of the said owner to settle past due accounts. Although lists of the identification numbers of cards which are no longer to be honored may be systematically circulated to the said retailers, it has been determined that the said retailers do not always conscientiously check these lists, due to the inconvenience thereof, before honoring a credit card whereby cards are honored that should not be and the value of the goods or services tendered on the basis thereof lost, in most cases, by the said issuing organizations.

It is accordingly an object of our invention to provide a method and apparatus whereby an identification number may be rapidly and automatically compared with a list of a plurality thereof to determine whether the former appears on the latter.

A further object of our invention is the provision of method and apparatus as above whereby such comparison may be effected in a simple and convenient manner requiring very little skill or exercise of judgement on the part of the operator of the said apparatus.

Another object of our invention is the provision of apparatus as above of durable, inexpensive, and readily portable construction.

A still further object of our invention is the provision of method and apparatus as above which make possible the simple and virtually foolproof, verification of the operational results of the said apparatus.

The above and other objects and advantages of our invention are believed made clear by detailed reference hereinbelow to the accompanying drawings wherein.

Figure 1:
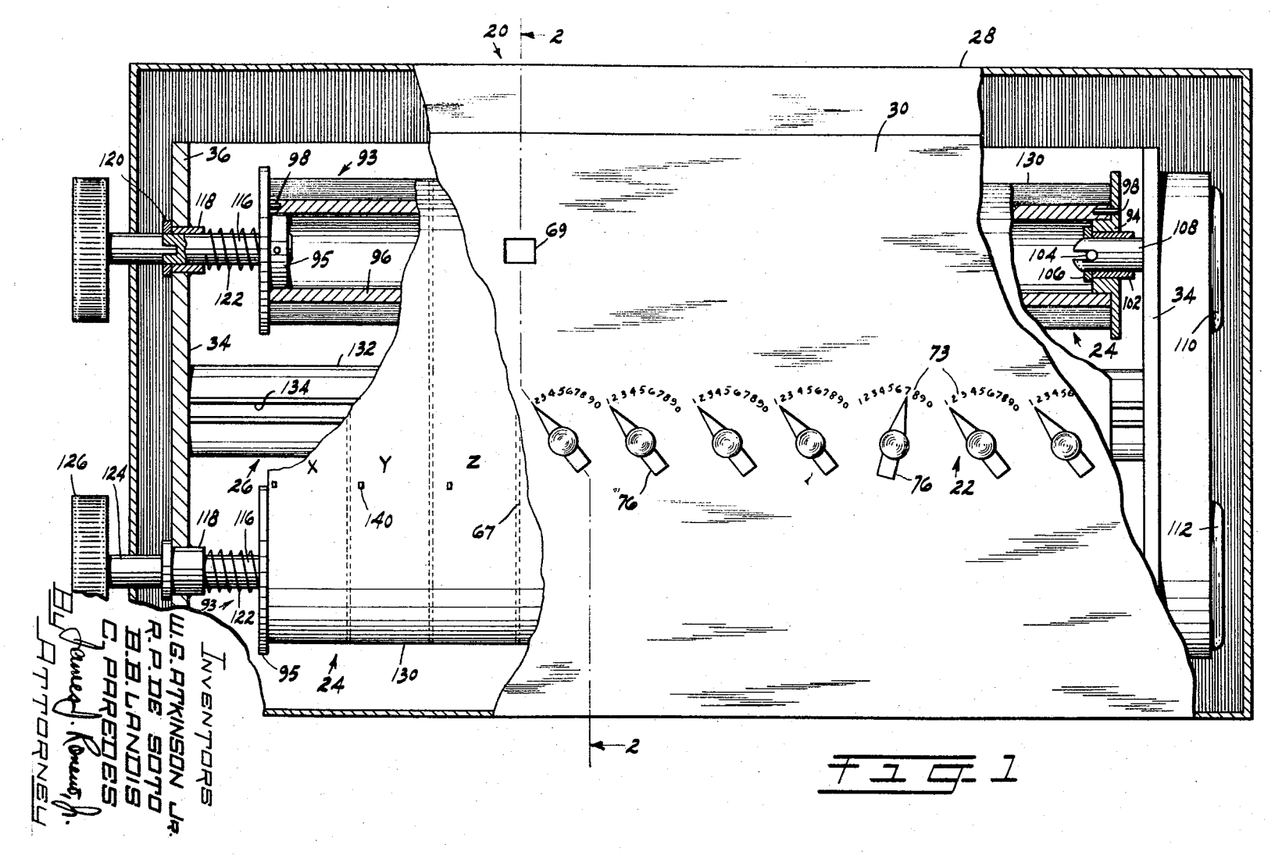
FIG. 1 is a top plan view, with portions cut away and parts in section of a first embodiment of our invention.
Figure 2:
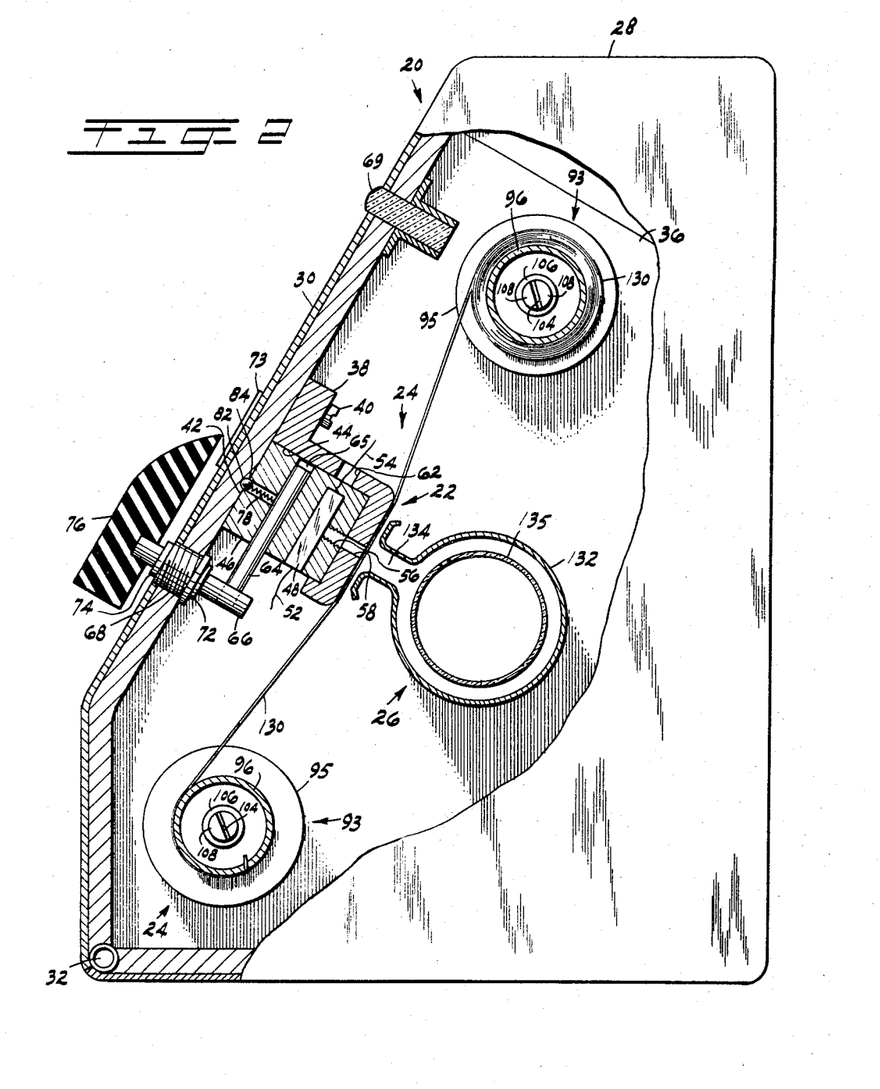
FIG. 2 is a cross-sectional view taken along line 2—2 of FIG. 1.

Referring now to FIGS. 1 and 2, the embodiment of our invention disclosed therein will be seen to comprise a cabinet indicated generally at 20, with a plurality of adjustably positionable light-responsive detecting means indicated generally at 22, a memory device and drive means therefor indicated generally at 24, and a light source for activating the detecting means indicated generally at 26, positioned as shown relative thereto in the manners made clear hereinbelow. The cabinet 20 is preferably, but not necessarily, of a standard, readily available size for purposes of manufacturing economy, and includes a main body portion 28 and a hinged front portion 30 pivotally attached thereto by hinge 32, whereby the cabinet may be opened by pivotal movement of the said front portion relative to the said main body portion. Internal mounting plates 34 and 36, respectively, are fixedly attached to the cabinet front portion 30 at opposite extremities thereof and extend therefrom as shown to form a readily openable, box-like support structure within the cabinet.

The adjustable, light-responsive detecting means 22, ten in number in the subject embodiment, are slidably supported from the front portion 30 of the cabinet. To this effect, a generally S shaped guide rail 38 is fixedly secured to the said cabinet front portion by attachment screws 40 and extends transversely thereof between mounting plates 34 and 36 to provide, in combination with the adjacent interior wall surface 42 of the said cabinet portion, a guide groove 44 of equal transverse extent. Each of the detecting means 22 comprises an opaque, generally cylindrically shaped mounting element 46, preferably but not necessarily of a natural anti-friction material such as Textolite, positioned as shown for sliding movement within the said guide groove 44.

A light activated switch 48, preferably but not necessarily of the nature described in Advance Specifications 190.30 of the General Electric Company, dated January 1963, is positioned as shown in a complementary shaped hole provided for the receipt thereof in each of the mounting elements 46, and includes leads 52 and 54 extending therefrom for connection in a control circuit in a manner described in detail hereinbelow in conjunction with the description of the control circuit of FIG. 3. The said switches are solid state devices of PNPN configuration and can function, when activated by a suitable light source, to in turn directly activate solenoids, contactors or sizeable loads far beyond the power rating of conventional photovoltaic or photo resistor devices. A tapped, light transmission aperture 56 is provided in each of the mounting elements 46 and terminates as shown at the surface of switch 48 whereby light from a suitable source may be transmitted to the latter. The tapping of the aperture substantially precludes any light, other than that directed right at the aperture, from impinging upon and activating the light activated switches. A transversely extending, light transmission slot 58 is formed in the guide rail 38 adjacent each adjustably positioned light-responsive detecting means 22, and must of course be of sufficient transverse extent so that the said slot and the light transmission aperture 56 are always in light transmitting registry throughout the entire range of positions through which the said detecting means are adjustable. A transversely extending lead slot 62 is similarly provided in the guide rail 38 adjacent each detecting means 22 whereby the leads 54 of the latter may pass freely therethrough so as not to interfere with relative movement therebetween during the adjustable positioning of the said detecting means.

An actuator arm 64 is slidably positioned at one extremity thereof within a transverse bore 65 provided therefor in each of the mounting elements 46, with the other extremity thereof fixedly secured in any convenient manner, as for example by a force fit, in a bore provided therefor in an adjustment post 66. The adjustment posts 66 are in turn journalled for rotation in suitable bearings 68 positioned as shown within the hinged front portion 30 of the cabinet. Snap rings 72 and 74 may be provided to maintain the posts properly positioned relative to the said bearings. An adjustment knob 76 is removably secured, in any convenient manner, to each of the adjustment posts to enable the convenient rotational adjustment of the said posts. Thus may be seen whereby rotation of the adjustment knobs and posts through a series of positions will result in transverse movement of the mounting elements 46 within guide groove 44 through a corresponding series of positions, due to the pivotal movement of the actuator arms 64 about the axis of rotation of the said posts and the sliding movement of the remote extremities of the said arms within mounting element bores 65.

Since it is desirable, as made clearer hereinbelow, that the various positions through which the said mounting elements are adjustable be clearly established, and the said elements positively maintained therein once adjusted thereto, a bore 78 is provided in each of the said elements, and a spring loaded, ball-shaped stop member 82 is slidably positioned therein to cooperate with a series of complementary shaped recesses 84 formed in the adjacent interior wall surface 42 of the cabinet from portion. Each of the said recesses is located to correspond with a numbered position of an adjustment knob 76 indicated by position indicating numerals 73 on the front portion of the cabinet as best seen in FIG. 1, whereby as a mounting element is positioned by adjustment of a said knob into one of the said positions, the ball-shaped stop member 82 associated therewith will enter, with an audible click, the recess 84 corresponding to the said position. Too, the cooperation between the said stop member and recess will establish a restraining force tending to maintain the mounting element as positioned to make impossible a change in mounting element and adjustment knob position in the absence of a purposeful turning of the said knob.

Turning now to the memory device 24, it will be seen to comprise two rollers generally indicated at 93, each of which in turn includes two flanged end plates 94 and 95, respectively, and a hollow, generally cylindrically shaped roller element 96 of any suitable material, as for example pressed cardboard, extending therebetween and removably attached thereto by drive pins 98 extending therebetween. The end plates 94 each comprise sleevelike elements 102 press fitted therein and including attachment pins 104 extending thereacross, whereby the said end plates may be removably secured as shown by snap rings 106 to the complementary shaped, grooved end portions of drive shafts 108 to enable the drive of the said rollers from the said shafts.

In the subject preferred embodiment, the memory device drive means include two uni-directional drive, electric motors 110 and 112, respectively, each of which is positioned as shown on cabinet mounting plate 34 in any convenient manner, and is drivingly rotatable in a different direction, with motor 110 being drivingly rotatable in the clockwise direction and the motor 112 in the counter-clockwise direction. Non-illustrated speed reduction means, as for example reduction gear trains or suitable belt and pulley arrangements are provided in the drive means intermediate the said electric motors and the drive shafts 108 whereby the latter may be driven by the former to in turn drive the rollers at reduced, practicable operational speeds.

The end plates 95 of the rollers each include a support shaft 116 fixedly secured thereto in any convenient manner, as for example by a press fit, and extending therefrom for rotatable mounting within bearings 118 provided therefor in the cabinet mounting plate 36. Readily removable snap rings 120 may be provided as shown to maintain the shafts properly positioned within the said plates.

Biasing springs 122 are positioned between the cabinet mounting plate 36 and the roller end plates 95 to bias the roller end plates 94 into contact with the drive shafts 108. Manual drive shafts 124 project through suitable apertures formed therefor in the side wall of the main body portion 28 of the cabinet and are secured, in any convenient and readily removable manner, to the respective extremities of the support shafts 116. The shafts 124 include manual drive knobs 126 secured thereto at the opposite ends thereof whereby the rollers may be manually driven by manual rotation of the said drive knobs.

A roll 130, including perforations 140 formed therein in transversely extending rows, is stored as shown on the roller elements 96 with the non-illustrated opposite ends thereof secured to the said roller elements in any convenient manner. The roll 130 may be any suitable material, as for example a thin, flexible paper sheet of suitable strength, and need only be relatively opaque for purposes made clearer hereinbelow. As best seen in FIG. 2, the perforated roll 130 is transferable between the roller elements 96 by rotation thereof to unwind the said roll from one of the said elements and wind it on the other. In travelling from one roller element to the other, the perforated roll is constrained to pass between the light source 26 and the adjacent wall surface of guide rail 38 in which are formed the light transmission slots 58 as made clear in FIG. 2.

Included in the said light source 26 is a light shield 132 which extends transversely within the cabinet between mounting walls 34 and 36 and is removably secured thereto in any convenient manner. The said light shield includes a light focusing aperture 134 of equal transverse extent. A clear light bulb 135, preferably but not necessarily of a readily available Lumaline type, with a light output commensurate with the operational requirements of the light activated switches 48, is positioned as shown within the light shield 132, whereby the beam of light emanating from the said bulb may pass in turn through the focusing aperture 134, a perforation 140 in roll 130, light transmission slot 58 in guide rail 38, a light transmission aperture 56 in a detecting element 46 (if in alignment therewith in the manner described in detail hereinbelow) to impinge upon and activate a said light activated switch.

In the subject preferred embodiment, ten adjustably positionable light-responsive detecting means 22 are provided with each said means being adjustable, through an attendant adjusting knob 76, through ten positions. The adjusting knobs are arranged in the spaced side-by-side manner made clear by FIG. 1 and it should be noted that a slight space is provided therebetween to insure that no overlapping occurs when adjacent knobs are in opposite extreme positions, i.e. when one knob is adjusted to the "1" position and the knob adjacent thereto on the left to the "0" position. It is of course well within the scope of our invention to provide more or less than ten detecting means 22 since the number thereof is dictated primarily by the extreme digital extent of the number to be represented by the respective positions of the said means as described in detail hereinbelow.

Since, in the subject preferred embodiment there are provided ten slightly spaced detecting means 22, ten slightly spaced column-like areas may be provided on the surface of the roll 130, with each said area in turn cooperatively associated with a separate detecting means and movable therepast as the said roll is wound between roller elements 96. Too, since each said detecting means is adjustable through ten separate numbered positions thereof, each of the said areas should include therewithin ten separate positions at which a perforation 140 may be formed in the said roll. For purposes of illustration, and convenience of description, three of these column-like areas have been delineated by dashed lines on the leftmost portion of the said roll as seen in FIG. 1 and identified therein as X, Y and Z respectively. Assuming perforations to be formed, as shown, in the first position (as seen from left to right to correspond with the arrangement of the adjustment knob position indicating numbers 73 on the front portion of the cabinet) in area X, the second position in area Y, and the third position in area Z, it may thus be understood whereby the light activated switches positioned respectively within the detecting means 22 cooperatively associated with the said column-like areas, will be exposed to and activated by the light beam from light bulb 135 only if the said detecting means are in turn positioned in the corresponding respective first, second and third positions thereof as indicated by the indicating numbers 73. This holds true because only in this event will the beams of light which pass through the said perforations and the transversely extending light transmission slots 58 of guide rail 38, be in alignment with the thusly positioned, relatively restricted light transmission apertures 56 of the mounting elements 46 for transmission to the respective light activated switches positioned therewithin. Pursuant to our invention, only one perforation 140 is to be formed in any row within a said column-like area.

Figure 3:
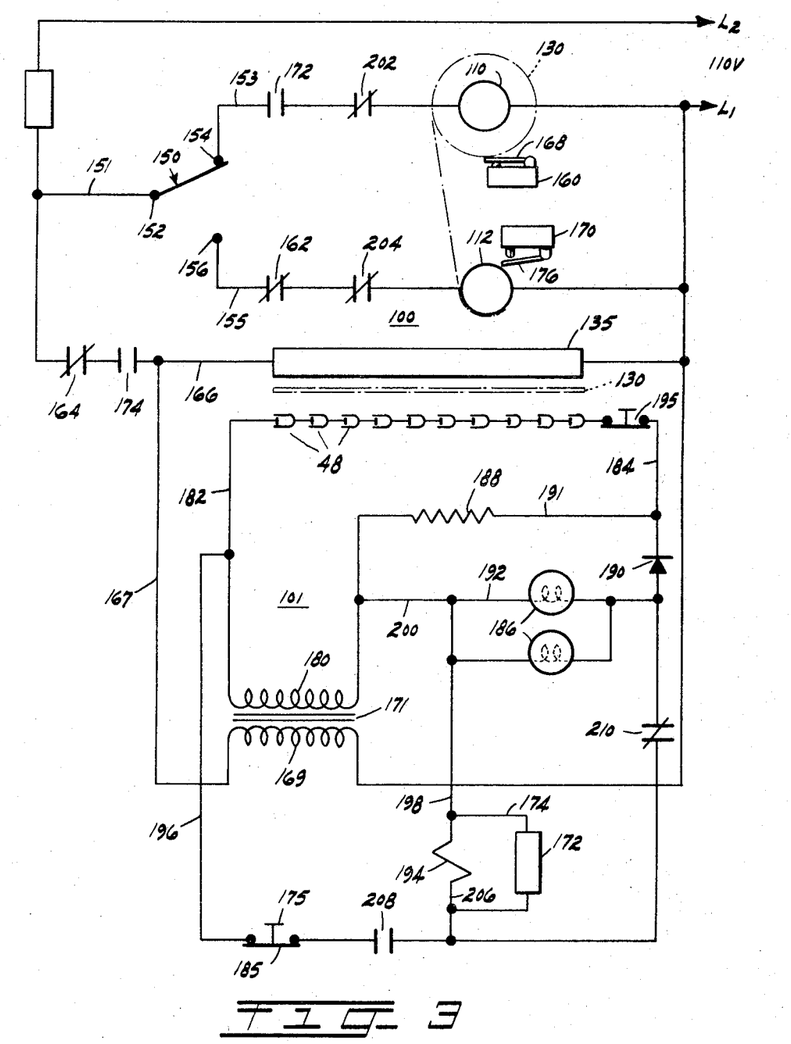
FIG. 3 is a schematic diagram of a control circuit for use in conjunction with the embodiment of FIG. 1.

Thus may be seen wherein each transverse row of ten perforations within the entire effective area of the roll 130 will function to represent a ten digit number to the ten detecting means 22, and it will be only in those instances wherein the said detecting means have been individually adjusted to detect the identical ten digit number, as indicated by the positions of adjustment knobs 76 relative to the position indicating numerals 73, that all ten of the light activated switches 48 will be exposed to the light from the light bulb and activated to complete the light sensitive portion of the control circuit of FIG. 3.

The identification numbers represented by the row of perforations 140 in roll 130 are printed in relatively small print on the surface of the said roll in the space between adjacent column-like areas as at 67 in FIG. 2; and a viewing lens 69, preferably of a magnifying type, provided in the front portion 30 of the cabinet in alignment with the said printed numbers to enable the viewing thereof. Each row of perforations, and the printed number corresponding thereto are spaced on the surface of the roll so that the printed number is visible through viewing lens 69 at the same time that the corresponding row of perforations representative of the same number is in alignment with the light transmission slots 58 in guide rail 38.

Referring now to the said control circuit it will be seen in FIG. 3 to comprise a motor control circuit, generally indicated at 100, to which power is supplied from any convenient 110 volt source through leads $L_1$ and $L_2$, and a light sensitive circuit, generally indicated at 101, and transformer coupled thereto through the secondary winding of transformer 171. Drive motors 110 and 112, hereinafter referred to as reverse and forward drive motors, respectively, and a manually operated single pole double throw switch 150 are connected as shown in circuit 100 across the leads $L_1$ and $L_2$ by lines 151, 153, and 155, respectively, whereby power may be selectively applied to the said motors in accordance with the positioning of the said switch. Thus with the switch 150 positioned as shown to connect stationary switch contacts 152 and 154, reverse drive motor 110 will be energized and forward drive motor 112 deenergized. Conversely, with the said switch positioned to connect stationary switch contacts 152 and 156, forward drive motor 112 will be energized and reverse drive motor 110 deenergized. Since switch 150 does not have a center or open position, contact 152 will at all times be connected to either of contacts 154 and 156.

Limit switch 160, including normally open contacts 162, connected as shown in line 155, and normally open contacts 164, connected as shown in line 166, is positioned as shown in any convenient manner with the actuator arm 168 thereof in contact with the roll 130 on the upper roller element 96. The said switch is constructed, and arranged relative to the said roll, so that the switch contacts 162 and 164 will be closed only when at least two layers of the roll 130 are sensed by the switch actuator arm 168 as remaining on the said upper roller element 96.

Limit switch 170, including normally open contacts 172, connected as shown in line 153, and normally open contacts 174, connected as shown in line 166, is positioned as shown in any convenient manner with the actuator arm 176 thereof in contact with the roll 130 on the lower roller element 96. Switch 170 is constructed, and arranged relative to the said roll, so that switch contacts 172 and 174 will be open only when there is no more than one layer of the roll remaining on the said lower roller element.

Light bulb 135, and the primary winding 169 of transformer 171 are connected as shown by lines 166 and 167, respectively, across leads $L_1$ and $L_2$, while an audible alarm 172, of any readily available suitable form, is connected across the coil of relay 194 by lines 174 and 206.

Light sensitive circuit 101 is transformer coupled to the motor control circuit 100 through the secondary windings 180 of transformer 171, and includes the ten light activated switches 48 of the ten detecting means 22 connected in series across the said secondary winding by lines 182 and 184, respectively. Warning lights 186, resistor 188 and SCR 190 are connected as shown with the series connected light activated switches through lines 191 and 192, respectively, with the function of the said resistor and SCR being to minimize any reverse leakage current through the said switches. A reset button 175, including ganged normally closed contacts 185 and 195, and a double throw, three pole relay 194 are connected as shown in series across the said secondary winding 180 by lines 196, 198, and 200, respectively. The relay includes four contacts 202, 204, 208 and 210, respectively, with relay contact 202 connected in line 153 of the motor control circuit 100, relay contact 204 connected in line 155 of the motor control circuit, and relay contacts 208 and 210 connected as shown in lines 196 and 184 of the light sensitive circuit 101. Contacts 195 of the reset button are connected as shown in line 184.

The relay 194 is constructed in such manner that contacts 202, 204 and 210 thereof will be closed, and contacts 208 opened, as depicted, in the deenergized condition of the relay. Conversely, the contacts 202, 204, and 210 will be opened, and contacts 208 of course closed when the said relay is energized.

In the operation of embodiment of FIGS. 1–3, the manual drive knobs 126 and attendant shafts 124 are removed, and the front portion 30 of the cabinet 20 pulled forward and opened to expose the upper and lower flanged end plates 94 and 95. A roller element 96, with a full roll 130, appropriately perforated to indicate the numbers against which a given number is to be checked, rolled thereon, is then operably positioned between the upper end plates by moving end plate 95 to the left against the action of spring 122, placing the right end of the said roller element against upper end plate 94 with drive pin 98 in alignment with the slot formed therein, and then releasing the upper end plate 95 to bear against the left end of the roller element while similarly aligning the other drive pin and slot. The lower roller element 96, at this point devoid of any portion of the roll 130, is then located in an identical manner between the lower end plates 95 and 96. The roll 130 is then manually unwound from the upper roller element, threaded between light shield 132 and the adjacent apertured surface of guide rail 38, and removably secured in any convenient manner, as for example that used in securing unexposed film to a take-up spool in a still camera, to the surface of the lower roller element 96. At this point, the relative positions of the roll roller elements, light shield and guide rail are as best seen in FIG. 2.

The front portion of the cabinet is then closed, the manual drive knobs 126 and attendant shafts 124 replaced, and the adjustment knobs 76 individually adjusted in relation to position indicating numbers 73 to indicate a number which is to be checked against the numbers represented by each row of perforations in the roll 130. This adjustment of the knobs 76 of course functions to position the light transmission apertures 56 in the mounting elements 46 in such manner so that only light from the bulb 135 which passes through a correspondingly positioned perforation in the roll 130 will impinge upon and activate the respective light activated switches 48 positioned within the said mounting elements. Switch 150 is then moved to the position thereof to connect stationary switch contacts 152 and 156 whereby the energization circuit to forward motor 112 is completed. Power is next applied to the circuit across leads $L_1$ and $L_2$ in any convenient manner, whereupon operation of the said forward motor will commence to unwind the perforated roll 130 from upper roller element 96, between the light source 135 and the appropriately positioned detecting means 22, and wind it on lower roller element 96. In the event that none of the numbers represented by the rows of perforations formed in the said roll correspond to the number represented by the aforementioned adjustments of the knobs 76, the light sensitive circuit 101 will remain open because all of the light activated switches 48 will never be simultaneously activated. Thus, operation of forward motor 112 will continue uninterrupted until less than two layers of the roll 130 remain on the upper roller element 96 whereupon switch contacts 162 of limit switch 160 will open to effectively break the energization circuit to forward motor 112 and thus discontinue operation of the device. At this point, if considered necessary, verification of the fact that no number represented by a row of perforations in the said roll corresponds to the number established by the setting of the knobs 76 may be effected by manually repositioning switch 150 to connect stationary switch contacts 152 and 154 whereupon reversing motor 110 will be energized to commence the rewinding of the roll on the upper roller element 96 and the operative re-passage thereof between the light source and the detecting means. This rewinding will, in all probability, continue uninterrupted until there is no more than one layer of the roll remaining on the said lower roller element whereupon switch contacts 172 of limit switch 170 will open to break the energization circuit to the said forward motor and again discontinue operation of the device.

At this juncture, the operator of the device can thus be quite certain that the number represented by the adjustment of the knobs 76 is not represented by a row of perforations in the roll 130. Thus, for example, had the given number represented by the adjustment of knobs 76 relative to position indicating numbers 73 been the number of a credit card proferred in return for goods or services to be charged to a credit account, and the numbers represented by the rows of perforations in the roll the numbers, as prepared at a central office beyond the control of the operator, of credit cards which were no longer to be honored for reasons such as non-payment on past due accounts, the operator of the device could, with full confidence, extend the requested goods or services to the bearer of the said credit card.

In the alternative event, however, that the number represented by the setting of the knobs 76 does correspond to a number represented by a said row of perforations, the ten light activated switches 48 will be simultaneously activated by the light from bulb 135 passing through the said perforations and the correspondingly positioned light transmission apertures 56 in the mounting elements 46 and simultaneously impinging on the said switches. Simultaneous activation of the said switches will function to complete the light sensitive circuit 101 whereupon current will flow from the secondary windings 180 of transformer 170 through the now activated switches to energize warning lights 186 and provide visual indication of the numerical correspondence. Simultaneously therewith, the said current flow will function to energize relay 194 to open relay contacts 202, 204 and 210, and close relay contacts 208. This opening of relay contacts 202 and 204 will of course function to break the energization circuits for both forward motor 112 and reverse motor 110 whereby whichever motor is operating will be brought to a halt. Thus is demonstrated whereby the device of our invention functions equally well in either direction of roll movement. Relay contact 208 closes and remains closed to complete a holding circuit to the relay 194 to maintain the energized condition thereof. This is made necessary by the inertia inherent in the moving motors, roll and upper and lower roller elements, whereby the row of perforations in the said roll which functioned to simultaneously activate the light activated switches will undoubtedly coast therepast upon the stopping of the motors, and once again open the light sensitive circuit through the deactivation of one or more of the said switches. Simultaneous activation of said light activated switches and closing of contacts 208 will also function to energize audible alarm 172 through lines 196, 206, 174 and 198, respectively, to provide audible indication of the numerical correspondence. Almost immediately after the energization of warning lights 186, the said lights will be deenergized by the opening of relay contacts 210 since, at this point, the light sensitive circuit 101 has again been opened by the inertia of the moving roll 130 and related components as set forth hereinabove.

Thus, at this juncture the device will have come to a halt with only the audible alarm energized to indicate that the number represented by the setting of the adjustment knobs 76 corresponds to a number represented by a row of perforations in the roll 130. At this point the operator would utilize one of the manual drive knobs 126 to manually rewind the roll to the point where the light activated switches are again simultaneously activated by light from bulb 135 simultaneously impinging thereon to again complete the light sensitive circuit 101, whereby the warning lights 186 will again be energized therethrough to verify the result. Since it is only at the precise point that the row of perforations which represent the number of interest are in direct alignment with the light transmission apertures 56 of the mounting elements 46, that the said warning lights will be energized, visual verification of the operation of the device may then be effected by viewing the number printed on the roll adjacent the said perforation row (which number is of course identical to the number represented by the said perforation row) through the viewing lens 69 provided therefor in the front portion of the cabinet, and comparing the said number with the number established by the setting of the adjustment knobs 76. At this point, and again considered in the context of the exemplary credit card situation referred to hereinabove, the operator could, again with full confidence, refuse to honor the credit card by refusing to extend the requested goods or services on the basis thereof.

In order to then prepare the device for the next utilization thereof, the operator need only depress the reset button and open normally closed contacts 185, whereby the holding circuit for the relay is opened and the relay deenergized accordingly to enable the completion of the winding of the roll on one of the roller elements. Depression of the reset button also functions to simultaneously open contacts 195 in line 184 to prevent chattering of the relay 194. Thus may be seen wherein the hereinabove disclosed preferred embodiment of our invention provides a virtually foolproof, convenient and inexpensive method of determining whether or not a given number corresponds to any one of a plurality of numbers stored in a memory device. As should be noted, the operation of the device is, from the standpoint of the operator, a simple task requiring only an ability to correctly position a plurality of knobs relative to a plurality of position indicating numerals to indicate a given number. Too, since, the perforations in the roll 130 may be conveniently pre-formed beyond the control of the operator, and the said roll then supplied thereto, the likelihood of an embarrassing, and potentially legally expensive mistake on the part of an operator, as for example in the mistaken refusal to honor a credit card in the situation referred to hereinabove is effectively precluded.

In an alternative form, a transparent roll 130 could be utilized and small, relatively opaque areas formed thereon in lieu of the perforations 140. In this instance, the light activated switches would of course be connected in parallel in the light sensitive circuit 101 of FIG. 3 whereby simultaneous deactivation, rather than activation, thereof by the small, relatively opaque areas formed on the roll would be required to complete the said light sensitive circuit to provide indication as above of numerical coincidence.

Figure 4:
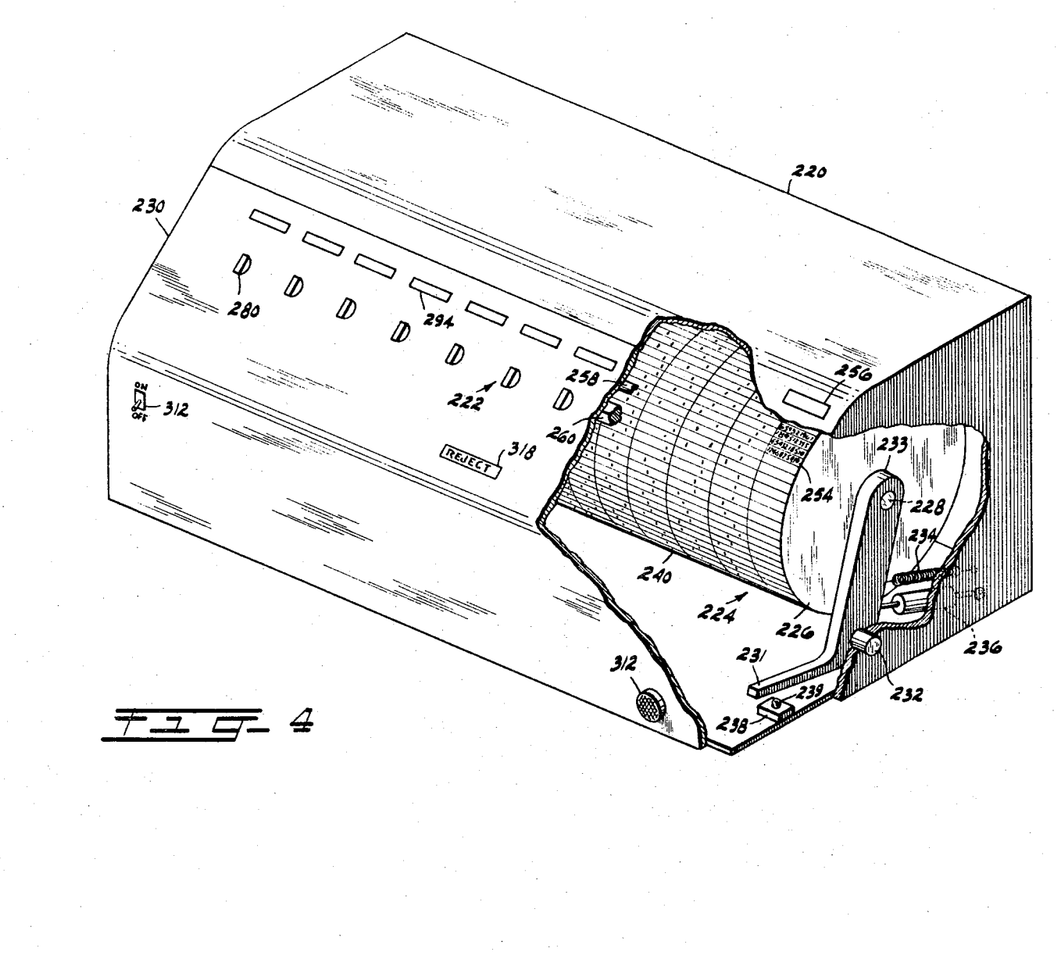
FIG. 4 is a perspective view, with portions cut away, of a second embodiment of our invention.
Figure 5:
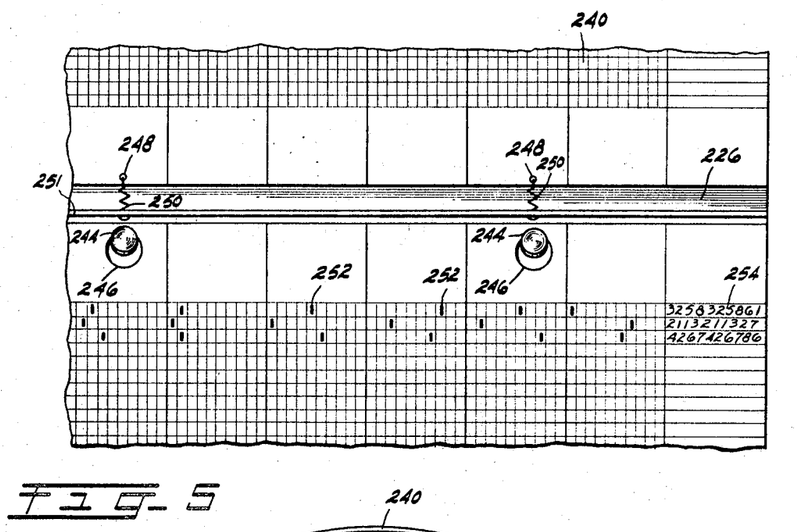
FIG. 5 is a top plan view, with portions omitted, of the memory device of the embodiment of FIG. 4.
Figure 6:
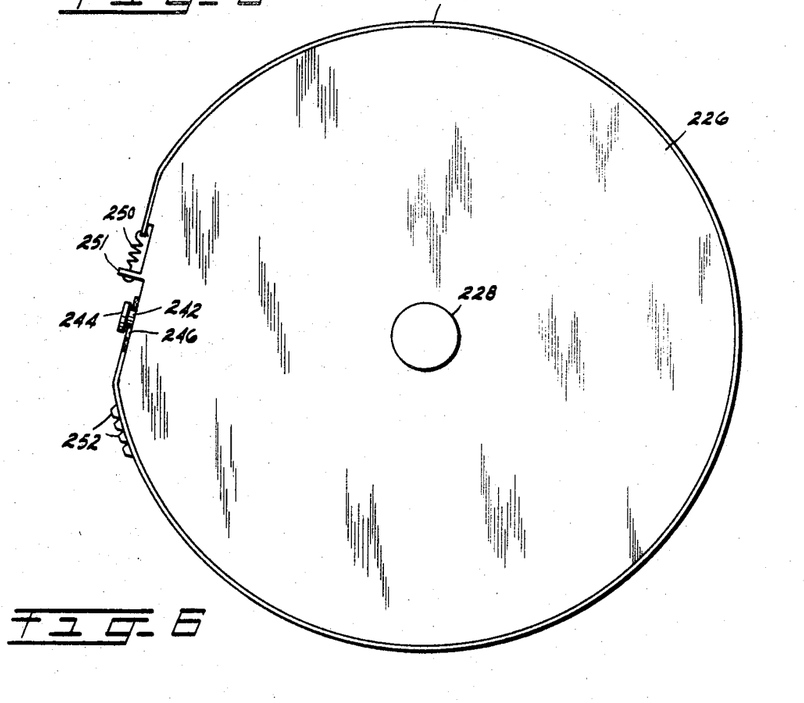
FIG. 6 is a side plan view of the memory device of FIG. 5.
Figure 7:
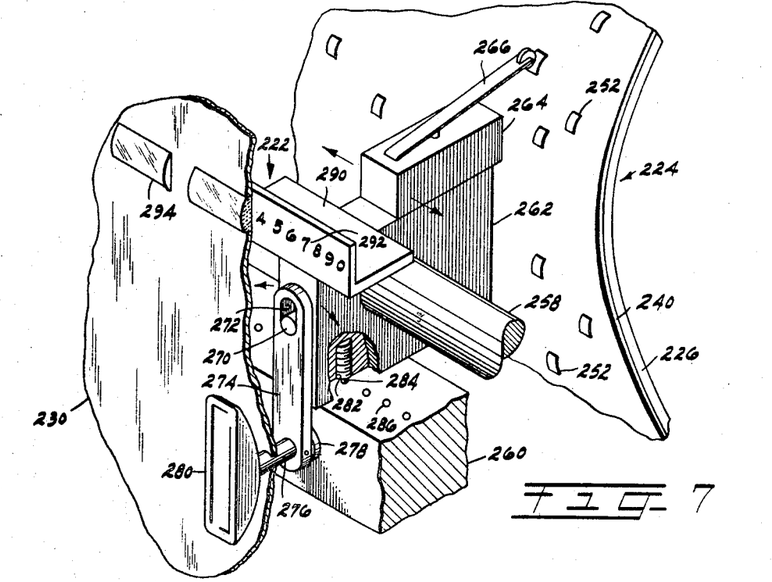
FIG. 7 is a perspective view, with portions cut away, of the detecting means and memory device of the embodiment of FIG. 4.

The embodiment of FIGS. 4–7 is similar in general construction and overall function to the embodiment of FIGS. 1–3, and comprises a cabinet 220, including a hinged front portion 230, with a plurality of detecting means indicated generally at 222, and a memory device indicated generally at 224 positioned relative thereto in the manner best seen in FIGS. 4 and 7. In this embodiment the said memory device comprises a hollow drum 226 with a drum shaft 228 extending therethrough and projecting therefrom as best seen in FIG. 4. The said shaft is rotatably journalled, at opposite sides of the drum, in generally L-shaped support members 233, only one of which is visible in the drawings. The support members 233 are pivotally supported by shafts 232 which extend therefrom and are rotatably journalled in suitable apertures provided therefor in the sides of the cabinet 220. A biasing spring 234 and a solenoid 236 are connected to the said support member and cabinet in any convenient manner so as to be positioned relative thereto as depicted in FIG. 4. Switch 238, including actuator 239, is mounted on the bottom of the cabinet 220 within the path of movement of arm 231 of the said support member.

A roll 240 of any suitable material, as for example pressed paper of suitable flexibility and strength, is securely positioned around the exterior surface of the drum 226 in a readily removable manner as best seen in FIGS. 5 and 6. To this effect, the said drum includes a plurality of attachment members 242, with enlarged end portions 244, extending therefrom at spaced intervals in a transverse row, and the roll 240 includes correspondingly located holes 246, of greater area than the said enlarged attachment member end portions, formed adjacent one edge portion thereof whereby the said edge portion may be removably attached to the said drum by the cooperation between the said holes and attachment members. Smaller holes 248 are formed at corresponding locations in the opposite edge portion of the roll 240 in line with the locations of spring-like attachment clips 250 which are secured to and extend from a transversely extending flange 251 formed on the surface of the drum 226. The clips 250 include hook-shaped ends which may be conveniently hooked within the said smaller holes 248 to securely position the roll around the drum in a readily removable manner. Projections 252 are formed as shown in transversely extending rows on the exterior surface of the roll 240. The said projections are identical in overall function to the perforations 140 of the embodiment of FIGS. 1–3, and will thus be seen to be arranged, one to a column like area, on the surface of the roll 240 to represent a number to the detecting means. A viewing lens 256 is provided on the front portion of the cabinet to enable visual inspection of these numbers for verification purposes as described hereinbelow. Non-illustrated drive means, preferably but not necessarily an electric motor, are operatively positioned relative to drum shaft 228, as for example on support member 233, to drivingly engage the said shaft and effect rotation of the said drum.

Detecting means 222 are supported by a support shaft 258 and a support block 260 which extend in the parallel, slightly spaced manner made clear by FIG. 7, transversely of the front portion 230 of the cabinet 220, and are attached thereto in any convenient manner at the respective extremities thereof. The ten detecting means of the subject embodiment each comprise a mounting block 262 which is slidably supported by the said support shaft 258 which extends as shown through a complementary shaped aperture formed in the said block. A readily actuatable switch 264, preferably but not necessarily a micro-switch, is fixedly mounted on the top surface of each of the mounting blocks and includes a rollered actuator arm 266 extending therefrom into contact with the adjacent surface of the roll 240 as seen in FIG. 7. The switches 264 are positioned relative to the said roll so that the actuator arms 266 thereof will be moved to close the said switches only upon the passage thereunder of a projection 252 in the manner depicted in the subject figure. Each of the mounting blocks 262 includes a shaft portion 270 extending therefrom for sliding engagement with the walls of an enlarged slot 272 formed in an adjacent extremity of a pivot member 274. The said pivot members are in turn pivotally mounted by the fixed attachment thereof to adjustment shafts 276 which extend through the opposite extremities thereof and are rotatably journalled in suitable combined spaces and bearing members 278 provided therefor in the adjacent surface of support block 260. The said adjustment shafts in turn extend through suitable holes provided therefor in the front portion 230 of the cabinet whereupon adjustment knobs 280 may be fixedly secured to the remote extremities thereof. A bore 282 is provided in the bottom surface of each of the mounting blocks 262, and a spring loaded stop means 284 positoned therein to cooperate with ten complementary shaped recesses 286 provided in the adjacent top surface of the support block 260. The said stop means 284 will thus function in the manner of the stop member 82 of the embodiment of FIGS. 1–3 to clearly establish, and maintain, the respective positions of adjustment knobs 280.

A generally L-shaped indicator 290 is fixedly positioned on the top surface of each of the mounting blocks 262 and comprises position indicating numerals 292 formed thereon whereby the switches 264 may be properly positioned in the desired manner by observation of the said numerals 292 through viewing lenses 294 correspondingly located in the cabinet front portion 230. Thus may be seen wherein the ten detecting means 222 of the subject embodiment may be readily adjusted through ten positions each by adjustment knobs 280 to represent a ten digit number in the same manner described in conjunction with the detecting means 22 of the embodiment of FIGS. 1–3. It may further be seen wherein each row of projections 252 on the roll 240 may be arranged to represent a number to the said detecting means in the manner of the perforations of the said embodiment. Thus, the cabinet 220 may be opened by virtue of the hinged front portion 230 thereof, and the roll 240 conveniently secured to the thusly exposed drum 226 in the manner described hereinabove in conjunction with FIGS. 5 and 6, whereby the number represented by the setting of the adjustment knobs 280 may be checked against the numbers represented by the said projection rows to determine any coincidence therebetween.

Figure 8:
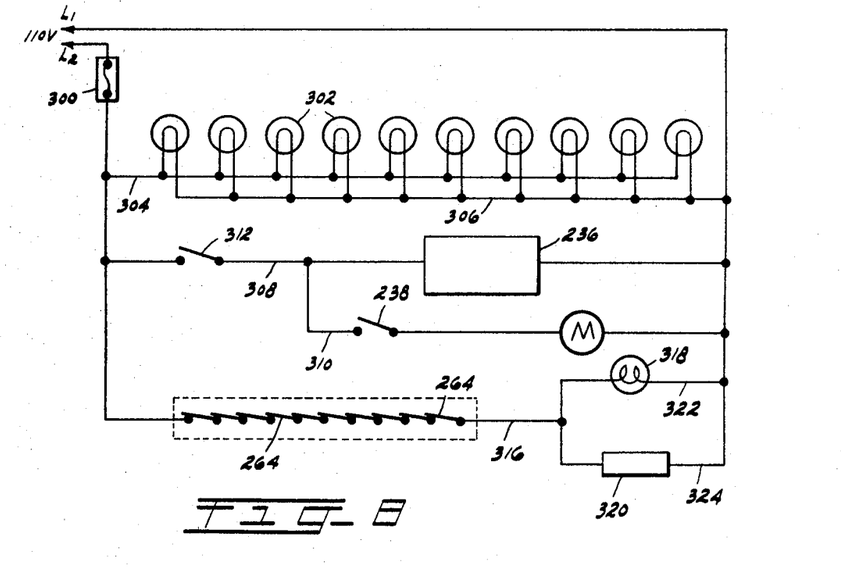
FIG. 8 is a schematic diagram of a control circuit for use in conjunction with the embodiment of FIGS. 4–7.

The embodiment of FIGS. 4–7 is operated through the simplified control circuit of FIG. 8 wherein power is supplied thereto from any convenient source thereof through leads $L_1$ and $L_2$. A fuse is connected in lead $L_2$ to prevent overloading of the circuit, and ten light bulbs 302 are connected as shown in series across the leads by lines 304 and 306 extending therebetween. The said light bulbs are positioned, in a non-illustrated manner, on the interior surface of cabinet front portion 230 adjacent each of the ten viewing lenses 294 to provide light for the reading of position indicating numerals 292 during adjustment of the knobs. Solenoid 236 (FIG. 4) and the otherwise non-illustrated drum drive motor M are connected in parallel across leads $L_1$ and $L_2$ by lines 308 and 310, respectively, with the energization thereof controlled by switches 312 and 238 connected as shown in the respective lines. The ten switches 264 are connected in series in line 316, and connected across the leads $L_1$ and $L_2$ by the parallel connected warning light 318 and audible alarm 320 in turn connected in series therewith through lines 322 and 324.

In operation, after a roll 240 has been secured to the drum 226 in the hereinabove described manner, and the front portion 230 of the cabinet 220 re-closed, switch 312 is manually closed to energize the solenoid 236 through line 308, whereby the said drum is moved by the solenoid against the action of biasing spring 234 from the retracted position thereof depicted in FIG. 4 to the operative position thereof depicted in FIG. 7 to enable the projections 252 to contact the actuators 266 of switches 264. As the drum assumes this latter position, arm 231 of L-shaped support member 233 will abut and depress actuator 239 of switch 238 to close the switch whereby the drive motor will be energized through line 310 to commence rotation of the said drum.

In the event that the number represented by the settings of adjustment knobs 280 does not coincide with any of the numbers represented by the respective rows of projections 252, the device of the subject embodiment will simply continue to operate until brought to a halt by the manual opening of switch 312. The time of operation would thus require some judgment on the part of the operator in determining when the drum 226 had made at least one (preferably two) complete revolutions while operatively positioned relative to the detecting means 222 in the manner depicted in FIG. 7. Guide means, such as a brightly colored marking, could of course be provided on the surface of the roll 240 so as to be visible once through viewing lens 256 for every complete revolution of the drum relative thereto to aid in the exercise of this judgment. Alternatively, switch 312 might include a built-in time delay feature whereby the switch would open automatically after the expiration of a predetermined period of time to discontinue operation of the device.

If the number represented by the settings of the adjustment knobs 280 does coincide with one of the numbers represented by the rows of roll projections 252, all ten switches 264 will be simultaneously closed due to the simultaneous action of the projections of the said row upon the actuator arms 266 of the said switches. At this point, warning light 318 and audible alarm 320 would be energized through lines 316, 318 and 324, respectively, to alert the operator to the fact of such coincidence. The said warning light and audible alarm would of course only remain energized for a short period of time due to the continued rotation of the drum 226. This short period of light and alarm energization would however be sufficient to alert the operator, whereupon the device could be brought to a halt by the opening of switch 312 and the drum returned, as for example by non-illustrated, readily insertable manual drive means of the nature of shaft 124 and knobs 126 of the embodiment of FIGS 1–3, to the position thereof where at the said warning light and audible alarm were again energized to enable visual vertification of the said numerical coincidence through the use of numbers 254 and viewing lens 256.

Figure 9:
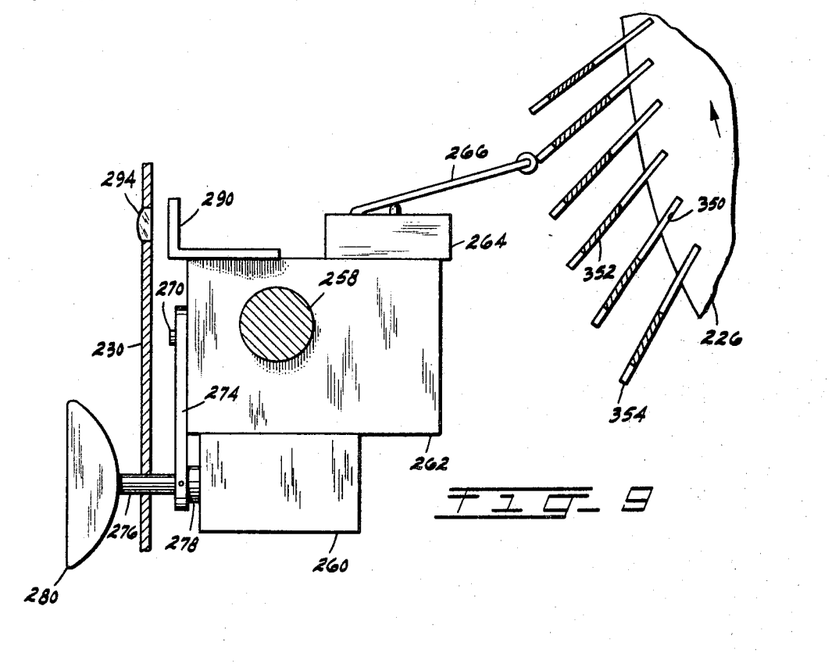
FIG. 9 is a detailed view, with parts in section of a third embodiment of our invention.
Figure 10:
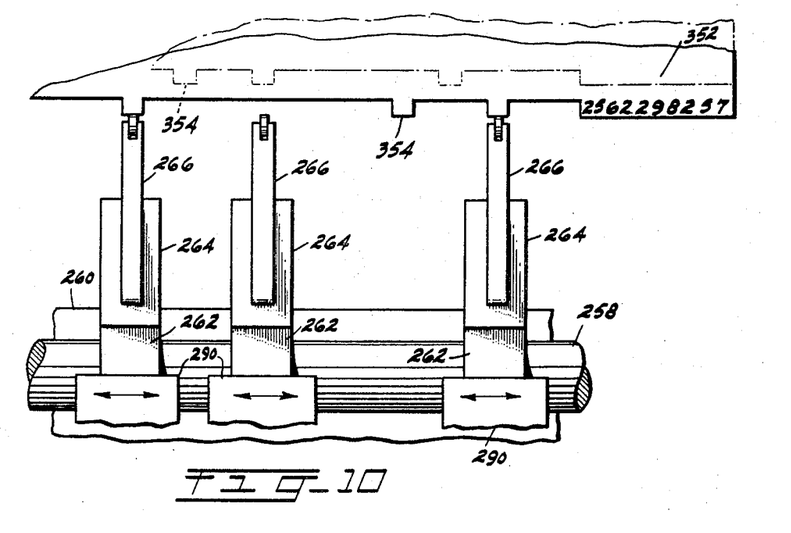
FIG. 10 is a top plan view, with portions cut away, of the embodiment of FIG. 9.

The embodiment of FIGS. 9 and 10 is identical to the embodiment of FIGS. 4–8, with the exceptions that the drum 226 includes a plurality of spaced, transversely extending slots 350 formed in the surface thereof, and the roll 240 is replaced by a series of plates 352, individually insertable in the said slots and each including ten projections 354 formed in the surface thereof to represent a single number to the ten detecting means 222. The said plates are maintained in the said slots in any convenient manner, as for example by a friction fit, and the said projections formed thereon function in the same manner relative to the actuator arms 266 of switches 264 as do the projections 252 of the roll 240 of the embodiment of FIGS. 4–8. The use of individual plates, rather than a unitary roll, to represent numbers to the detecting means 222 makes possible the changing of some only of the numbers to be so represented without changing the entire memory device. Thus, for example, should it be desired to change only five of the said numbers, this could be readily accomplished by the changing of only the five appropriate plates while leaving the others intact.

While we have shown and described the preferred embodiment of our invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What we claim is:

1. In an apparatus for automatically comparing an indicia of identification, in succession, with a plurality of such indicia to determine any coincidence therebetween, a housing, a plurality of adjustably positionable detecting means supported from said housing for representing said first-mentioned indicia in accordance with the respective positions thereof, a memory device supported from said housing and cooperatively associated with said detecting means, said memory device and said detecting means being relatively movable, said memory device including a plurality of means for successively representing said second-mentioned indicia to said detecting means in accordance with the respective relative positions thereof, said detecting means including means responsive to said memory device means for actuation thereby only if the relative respective positions thereof coincide, indicating means cooperatively associated with said detecting means and responsive only to simultaneous actuation of said means responsive to said memory device means to provide indication of such actuation, and means to effect relative movement between said detecting means and said memory device, whereby the said indicia will be successively compared and indication provided only if the first-mentioned indicia, as represented by the respective positions of the detecting means, coincide with any of the second-mentioned indicia, as represented by the relative respective positions of the memory device means, said housing comprising guide means, and said detecting means comprising mounting means slidably supported by said guide means and adjustably positionable relative thereto, said means responsive to said memory device being operatively supported by said mounting means, and said mounting means comprising light transmission aperatures formed therein and said means responsive to said memory device means comprising light activated switches positioned within said mounting means in light transmission communication with said light transmission apertures whereby light may pass through said apertures to impinge upon and activate the said switches.

2. In an apparatus as in claim 1 wherein said guide means comprise a guide rail with at least one light transmission slot formed therein, said guide rail and said interior wall forming a guide groove therebetween within which the said mounting means are slidably supported, said light transmission apertures of said mounting means being in alignment with said light transmission slot throughout all positions of the said mounting means relative to the said guide rail.

3. In an apparatus as in claim 2 wherein said detecting means further comprise adjusting means operatively associated with said mounting means and extending therefrom outside the said housing whereby the said mounting means may be adjustably positioned within the said guide groove from outside the housing.

4. In an apparatus as in claim 1 wherein said memory device comprises a source of light positioned adjacent said mounting means in alignment with the said light transmission apertures formed therein, and a relatively opaque member movably positioned between said source and said apertures, and wherein said memory device means comprise perforations formed in said member whereby only light from said source which passes through the said perforations may in turn pass through said light transmission apertures to impinge upon and activate said light activated switches.

5. In an apparatus as in claim 4 wherein said perforated member is a roll and said memory device further comprises two roller elements removably secured within said housing and positioned to opposite sides of said light source and mounting means, whereby said roll may be stored by rolling on said roller elements and transferred therebetween by driven rotation of said elements by said relative movement effecting means to pass between said light source and said mounting means.

6. In an apparatus as in claim 1 wherein said relative movement effecting means comprise an electric motor and said indicating means comprise cooperatively associated warning and motor energization circuits with said light activated switches being connected in said warning circuit so that the said circuit is completed only upon the simultaneous activation thereof, said warning and motor energization circuits being cooperatively associated so that the latter is opened upon completion of the former.

7. In an apparatus as in claim 5 wherein said relative movement effecting means comprise an electric motor and said indicating means comprise cooperatively associated warning and motor energization circuits with said light activated switches being connected in said warning circuit so that the said circuit is completed only upon the simultaneous activation thereof, said warning and motor energization circuits being cooperatively associated so that the latter is opened upon completion of the former.

8. In an apparatus as in claim 7 wherein said warning circuit includes a relay connected therein for energization only when said circuit is completed through said light activated switches, and said warning and motor energization circuits are cooperatively associated through at least one contact of said relay which is connected in the latter and is open only when said relay is energized, and wherein said motor energization circuit further includes at least one limit switch connected therein and responsive to the amount of said roll on at least one of said roller elements for opening said motor energization circuit independently of said warning circuit.

9. In an apparatus as in claim 7 wherein said housing is a cabinet which comprises an openable front portion and said guide rail and roller elements are secured thereto whereby said detecting means and memory device may be readily exposed by opening said cabinet portion.

10. In an apparatus for automatically comparing an indicia of identification, in succession, with a plurality of such indicia to determine any coincidence therebetween, a housing, a plurality of adjustably positionable detecting means supported from said housing for representing said first-mentioned indicia in accordance with the respective positions thereof, a memory device supported from said housing and cooperatively associated with said detecting means, said memory device and said detecting means being relatively movable, said memory device including a plurality of means for successively representing said second-mentioned indicia to said detecting means in accordance with the respective relative positions thereof, said detecting means including means responsive to said memory device means for actuation thereby only if the relative respective positions thereof coincide, indicating means cooperatively associated with said detecting means and responsive only to simultaneous actuation of said means responsive to said memory device means to provide indication of such actuation, and means to effect relative movement between said detecting means and said memory device, whereby the said indicia will be successively compared and indication provided only if the first-mentioned indicia, as represented by the respective positions of the detecting means, coincide with any of the second-mentioned indicia, as represented by the relative respective positions of the memory device means, said housing comprising guide means, and said detecting means comprising mounting means slidably supported by said guide means and adjustably positionable relative thereto, said means responsive to said memory device being operatively supported by said mounting means, said means responsive to said memory device means comprising switch means with actuator means projecting therefrom for actuation by said memory device means.

11. In an apparatus as in claim 10 wherein said memory device comprises a generally cylindrical support means with a member removably secured thereto, and said memory device means comprise projections formed on said member and extending therefrom for contacting and actuating said switch means actuator means.

12. In an apparatus as in claim 11 wherein the means to effect relative movement between the detecting means and memory device comprise an electric motor and energization circuit therefor for rotatably driving the said cylindrical support means, and wherein said support means are further movable from an inoperative position thereof relative to said switch means to an operative position thereof relative thereto, said energization circuit including further switch means for completing said circuit only when said support means are operatively positioned relative to said first-mentioned switch means.

13. In an apparatus as in claim 11 wherein said guide means comprise a guide shaft and said mounting means comprise mounting blocks with holes formed therein, of slightly larger diameter than the diameter of said shaft, through which said shaft extends whereby said blocks may be slidably supported therefrom.

14. In an apparatus as in claim 13 wherein said detecting means further comprise adjusting means operatively associated with said mounting blocks and extending therefrom outside the said housing whereby the said mounting blocks may be adjustably positioned along the said guide shaft from outside the housing.

15. In an apparatus as in claim 10 wherein said memory device comprises a generally cylindrical support means including spaced slots formed in the periphery thereof and individual plates insertable respectively into said slots, and said memory device means include projections formed on said plates and extending therefrom for contacting and actuating said switch actuator means.

16. In an apparatus as in claim 15 wherein the means to effect relative movement between the detecting means and memory device comprise an electric motor and energization circuit therefor for rotatably driving the said cylindrical support means and wherein said support means are further movable from an inoperative position thereof relative to said switch means to an operative position thereof relative thereto, said energization circuit including further switch means for completing said circuit only when said support means are operatively positioned relative to said first-mentioned switch means.

17. In an apparatus as in claim 5 wherein said indicia of identification are identification numbers, said perforations are formed in spaced, transversely extending rows on said roll with each said row representing a said identification number to the detecting means, and wherein each said number is printed on the roll spaced from the corresponding row of perforations, and said housing includes viewing means projecting therethrough in substantial alignment with said printed numbers as the said corresponding rows of perforations are moved past the said light transmission apertures.

18. In an apparatus as in claim 14 wherein said indicia of identification are identification numbers, said projections are formed in spaced, transversely extending rows on said memory device member with each said row representing a said identification number to the detecting means, and wherein each said number is printed on the said memory device member in substantial transverse alignment with the corresponding row of projections and said housing includes viewing means projecting therethrough in substantial alignment with said printed numbers as the said memory device member is rotably driven therepast.

References Cited
UNITED STATES PATENTS

| | | | |
|---|---|---|---|
| 2,034,436 | 3/1936 | Highstone | 340—149 |
| 2,146,834 | 2/1939 | McGain | 235—61.7 |
| 2,254,932 | 9/1941 | Bryce | 235—61.7 |
| 3,262,124 | 7/1966 | Albiani | 235—61.7 |

MAYNARD R. WILBUR, *Primary Examiner.*

J. SHERIDAN, *Assistant Examiner.*